US009683138B2

(12) United States Patent
Furuta et al.

(10) Patent No.: US 9,683,138 B2
(45) Date of Patent: Jun. 20, 2017

(54) PRESSURE-SENSITIVE ADHESIVE SHEET AND MAGNETIC DISK DRIVE

(71) Applicant: NITTO DENKO CORPORATION, Ibaraki-shi, Osaka (JP)

(72) Inventors: Kenji Furuta, Osaka (JP); Yoshio Terada, Osaka (JP); Kota Nakao, Osaka (JP); Akira Hirao, Osaka (JP); Ryo Morioka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/186,032

(22) Filed: Jun. 17, 2016

(65) Prior Publication Data

US 2016/0376473 A1      Dec. 29, 2016

(30) Foreign Application Priority Data

Jun. 26, 2015   (JP) .................................. 2015-128524
Mar. 17, 2016   (JP) .................................. 2016-053764

(51) Int. Cl.
*C09J 7/02*      (2006.01)
*C09J 201/00*    (2006.01)
*B32B 15/08*     (2006.01)
*G11B 33/14*     (2006.01)
*C09J 133/06*    (2006.01)
*C09J 133/08*    (2006.01)

(52) U.S. Cl.
CPC ............. *C09J 7/0296* (2013.01); *B32B 15/08* (2013.01); *C09J 7/0246* (2013.01); *C09J 133/06* (2013.01); *G11B 33/1446* (2013.01); *C09J 133/08* (2013.01); *C09J 2201/606* (2013.01); *C09J 2201/622* (2013.01); *C09J 2203/326* (2013.01); *C09J 2400/163* (2013.01); *C09J 2423/106* (2013.01); *C09J 2433/00* (2013.01); *C09J 2467/006* (2013.01)

(58) Field of Classification Search
None
See application file for complete search history.

(56) References Cited

U.S. PATENT DOCUMENTS

| 8,248,724 | B2 | 8/2012 | Hayakawa et al. |
| 9,025,279 | B2 | 5/2015 | Furuta et al. |
| 2011/0038076 | A1 | 2/2011 | Hayakawa et al. |
| 2014/0240869 | A1 | 8/2014 | Furuta et al. |

FOREIGN PATENT DOCUMENTS

| JP | 2010-003356 A | 1/2010 |
| JP | 2014-162874 A | 9/2014 |

*Primary Examiner* — Craig A. Renner
(74) *Attorney, Agent, or Firm* — Sughrue Mion, PLLC (57) ABSTRACT

A pressure-sensitive adhesive sheet includes a pressure-sensitive adhesive layer and a base including a metal layer and a resin layer, and a product of an initial elastic modulus of the base and a total thickness of the base is 3000 N/mm or less, and a separation distance is 2 mm or less, the separation distance is measured with a peel test with a constant load as follows: a test piece of the pressure-sensitive adhesive sheet having a 10 mm width and a 100 mm length is attached to a surface of a stainless steel test plate and then, the test plate is left standing at a temperature of 23° C. for twenty four hours and then, a load of 100 gf is applied to one end of a length dimension of the test piece vertical to the surface of the test plate and a separation distance of the test piece is measured after one hour.

20 Claims, 6 Drawing Sheets

PRESSURE-SENSITIVE ADHESIVE SHEET AND MAGNETIC DISK DRIVE

CROSS REFERENCE TO RELATED APPLICATION

This application claims priority from Japanese Patent Application No. 2015-128524 filed on Jun. 26, 2015 and Japanese Patent Application No. 2016-053764 filed on Mar. 17, 2016. The entire contents of the priority application are incorporated herein by reference.

FIELD OF THE INVENTION

The present disclosure relates to a pressure-sensitive sheet and a magnetic disk drive.

BACKGROUND

A pressure-sensitive sheet used in a magnetic disk drive has been known as is described in Patent Document 1. An example of such a pressure-sensitive sheet includes a cover seal. The cover seal is used to cover a small gap (at a joint) provided between a box-shaped base member of the magnetic disk drive and a plate-shaped cover member attached to the base member.

Thus, airtightness of the magnetic disk drive is ensured by using the pressure-sensitive sheet and foreign substances such as moisture and siloxane compound that may adversely affect the magnetic disk drive are less likely to enter the magnetic disk drive.

To improve properties of the magnetic disk drive, inside of the magnetic disk drive may be filled with low density gas such as helium gas instead of air as is described in Patent Document 2. If the inside of the magnetic disk device is filled with gas having lower density than air, the disturbance of an air flow that may be caused in driving of the magnetic disk drive is less likely to occur and the properties of the magnetic disk drive are improved.

[Patent Document 1] Japanese Unexamined Patent Application Publication No. 2014-162874

[Patent Document 2] Japanese Unexamined Patent Application Publication No. 2010-3356

SUMMARY OF THE INVENTION

According to the present technology, a pressure-sensitive adhesive sheet includes a pressure-sensitive adhesive layer having an adhesive surface on a rear side thereof, the adhesive surface being attached to an adherend, and a base including a metal layer disposed on a front side with respect to the adhesive layer and a resin layer disposed on a front side with respect to the metal layer. A product of an initial elastic modulus of the base and a total thickness of the base is 3000 N/mm or less, and a separation distance is 2 mm or less, and the separation distance is measured with a peel test with a constant load as follows: a test piece of the pressure-sensitive adhesive sheet having a width of 10 mm and a length of 100 mm is attached to a surface of a test plate made of stainless steel plate such that the adhesive surface is attached to the surface of the test plate and then, the test plate is left standing at a temperature of 23° C. for twenty four hours and then, a load of 100 gf is applied to one end of a length dimension of the test piece vertical to the surface of the test plate and a separation distance of the test piece is measured after one hour.

DETAILED DESCRIPTION

The low density gas such as helium gas is likely to leak from the inside to the outside of the magnetic disk drive. Therefore, there has been a demand for a pressure-sensitive adhesive sheet that prevents the low density gas inside the magnetic disk drive from leaking to the outside thereof.

Such a pressure-sensitive adhesive sheet may be attached to an adherend with being spread in a flat state. If the pressure-sensitive adhesive sheet is attached to the adherend with covering an open portion of the adherend and being bent along a shape of the adherend, the pressure-sensitive sheet may be separated from the adherend so that a gap may be generated between the pressure-sensitive adhesive sheet and the adherend. Gas may easily pass through the gap and gas barrier properties of the pressure-sensitive adhesive sheet may be deteriorated.

The present invention was made to solve the above described problems and to achieve the following object. An object of the present invention is to provide a pressure-sensitive adhesive sheet having excellent gas barrier properties and excellent repulsion resistance that keeps close adhesion to an adherend with being bent along a shape of the adherend.

Another object of the present invention is to provide a magnetic disk drive that includes the above pressure-sensitive adhesive sheet.

Hereinafter, embodiments of the present invention will be described with reference to the drawings.

A pressure-sensitive adhesive sheet includes a base that is a front-side surface and a pressure-sensitive adhesive layer on a rear side of the base. The pressure-sensitive adhesive sheet before use (before the sheet is attached to an adherend) includes a release liner that is attached to a surface (an adhesive surface) of the pressure-sensitive adhesive layer of the pressure-sensitive adhesive sheet.

The pressure-sensitive adhesive sheet may also be referred to by a different name such as a pressure-sensitive adhesive tape and a pressure-sensitive adhesive film. The term "pressure-sensitive adhesive sheet" is used throughout this specification. A surface of the pressure-sensitive adhesive layer of the pressure-sensitive adhesive sheet may be referred to as an "adhesive surface".

Figure 1:
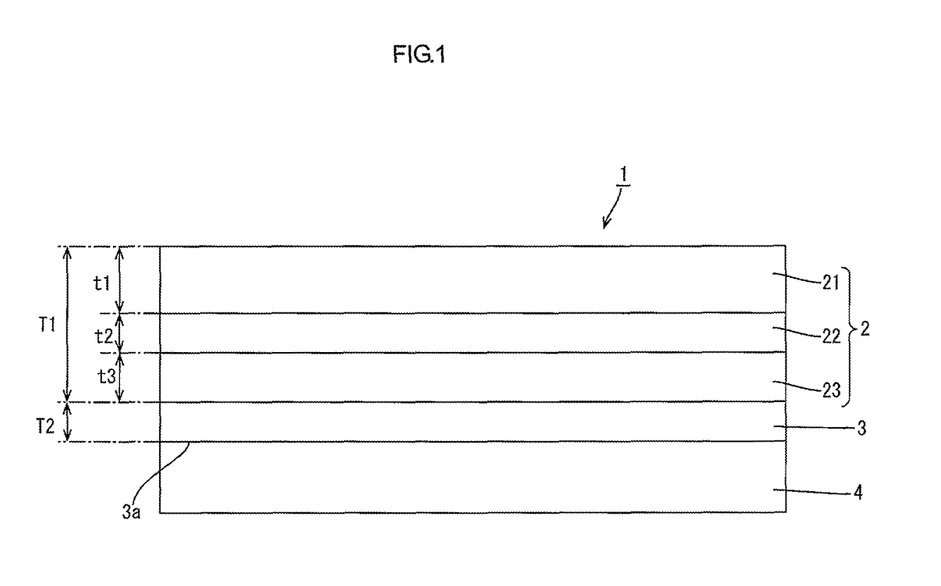
FIG. 1 is a cross-sectional view typically illustrating a configuration of a pressure-sensitive adhesive sheet according to an embodiment of the present invention.

FIG. 1 is a cross-sectional view typically illustrating a configuration of a pressure-sensitive adhesive sheet 1 according to one embodiment of the present invention. The pressure-sensitive adhesive sheet 1 includes a base 2 including three layers. The base 2 includes a first resin layer (corresponds to a resin layer of the present invention) 21 that is on a front-surface side, a metal layer 22 that is on a rear side of the first resin layer 21, and a second resin layer (corresponds to another resin layer of the present invention) 23 that is on a rear side of the metal layer 22. The pressure-sensitive adhesive sheet 1 includes the base 2 and a pressure-sensitive adhesive layer 3 that is disposed on a rear side of the base 2. The pressure-sensitive adhesive layer 3 is disposed on a rear side of the second resin layer 23. In FIG. 1, a release liner 4 is attached to a rear-side surface (an adhesive surface) 3a of the pressure-sensitive adhesive layer 3.

Figure 2:
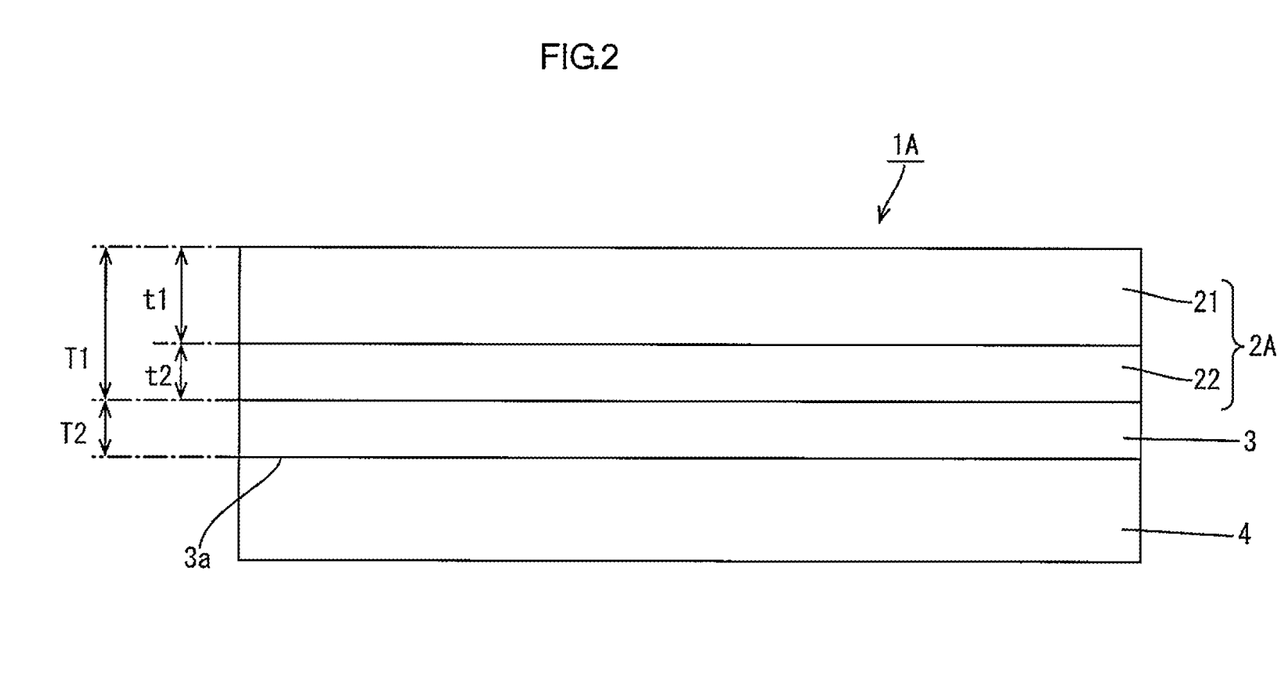
FIG. 2 is a cross-sectional view typically illustrating a configuration of a pressure-sensitive adhesive sheet according to another embodiment of the present invention.

FIG. 2 is a cross-sectional view typically illustrating a configuration of a pressure-sensitive adhesive sheet 1A according to another embodiment of the present invention. The pressure-sensitive adhesive sheet 1A includes a base 2A including two layers. The base 2A includes the first resin layer (corresponds to the resin layer of the present invention) 21 that is on a front-surface side, and the metal layer 22 that is on a rear side of the first resin layer 21. The pressure-sensitive adhesive sheet 1A includes the base 2A and the pressure-sensitive adhesive layer 3 that is disposed on a rear side of the base 2A. The pressure-sensitive adhesive layer 3 is disposed on a rear side of the metal layer 22. In FIG. 2, the release liner 4 is attached to a rear-side surface (an adhesive surface) of the pressure-sensitive adhesive layer 3.

The pressure-sensitive adhesive sheet may include other layers, such as an intermediate layer, an undercoat, and a laminate layer, in addition to the base and the pressure-sensitive adhesive layer as long as the pressure-sensitive adhesive sheet can achieve the object of the present invention. Hereinafter, components of the pressure-sensitive adhesive sheet will be described.

(Base)

The pressure-sensitive adhesive layer is attached to the base and the base is deformable to follow a surface shape of an adherend. The metal layer and the resin layer (the first resin layer, the second resin layer), which are included in the base, are laminated by a known laminating process such as dry laminating process. A laminate layer may be formed between the metal layer and the resin layer (for example, between the metal layer and the first resin layer and between the metal layer and the second resin layer).

The base has an initial elastic modulus ($N/nm^2$) of 3000 $N/nm^2$ or less, preferably 2800 $N/nm^2$ or less, more preferably 2600 $N/nm^2$ or less. The initial elastic modulus $N/nm^2$ is measured by a method described below. The base (the pressure-sensitive adhesive sheet) having the initial elastic modulus within the above range is kept with being deformed (bent) along the shape of the adherend. A lower limit value of the initial elastic modulus, which is not particularly limited, may be preferably 1000 $N/nm^2$ or more, more preferably 1200 $N/nm^2$ or more, and much more preferably 1400 $N/nm^2$ or more.

A thickness (a total thickness T1) of the base is not particularly limited but may be determined as appropriate for a purpose. The base may have a thickness (the total thickness T1) as a lower limit value of preferably 20 μm or more, more preferably 25 μm or more, and much more preferably 28 μm or more. The base may have a thickness (the total thickness T1) as an upper limit value of preferably 75 μm or less, more preferably 70 μm or less, and much more preferably 65 μm or less.

The pressure-sensitive adhesive sheet including the base having the thickness (the total thickness T1) within the above range is likely to be attached to an adherend with being deformed (bent) along the surface shape of the adherend. Further, the pressure-sensitive adhesive sheet can be reduced in thickness.

A product (N/mm) obtained by multiplying the initial elastic modulus ($N/nm^2$) by the thickness (the total thickness T1) of the base is set 3000 N/mm or less, preferably 2800 N/mm or less, and more preferably 2600 N/mm or less. The base having the product (N/mm) within the above range is kept with being deformed (bent) along the shape of the adherend. A lower limit value of the product (N/mm), which is not particularly limited, is preferably 1000 N/mm or more, more preferably 1200 N/mm, and much more preferably 1400 N/mm.

One or both surfaces of the base may be subjected to a known surface treatment, for example, a chemical or physical treatment, such as chromic acid treatment, ozone exposure, flame exposure, high-pressure electrical-shock exposure, and ionization radiation treatment, or may be coated with a primer. For example, the surface of the second resin layer (another resin layer) disposed on the rear side of the base may be subjected to the surface treatment to improve adhesion between the surface of the second resin layer and the pressure-sensitive adhesive layer.

<Metal Layer>

The metal layer is an essential component in the base and keeps rigidity of the base. The metal layer may be a layer made of metal material such as aluminum, copper, silver, iron, nickel, tin, and stainless steel. The metal layer may be made of a metal foil (a rolled metal sheet) or a metal film that is formed by a known film formation method such as a deposition method and a sputtering method. The metal layer may be preferably made of an aluminum layer (an aluminum foil), because the pressure-sensitive adhesive sheet including the metal layer made of aluminum layer is likely to be plastically deformed and keep a deformed state when being deformed (bent) along the surface shape of the adherend.

A thickness t2 of the metal layer, which is not particularly limited, may be determined as appropriate for a purpose. A lower limit value of the thickness t2 of the metal layer is preferably 2 μm or more, more preferably 4 μm or more, and much more preferably 6 μm or more. An upper limit value of the thickness t2 of the metal layer is preferably 15 μm or less, more preferably 13 μm or less, and much more preferably 10 μm or less.

The pressure-sensitive adhesive sheet including the metal layer within the above thickness is likely to be kept in a plastically deformed state when deformed (bent) along the surface shape of the adherend.

<First Resin Layer>

The first resin layer, which is an essential component, is disposed on the front side of the base and made of resin material in a film shape. The first resin layer is disposed on the metal layer to cover the metal layer from the front side. The first resin layer protects the metal layer from being damaged by an external force when and after the pressure-sensitive adhesive sheet is attached to an adherend.

Examples of a resin material used for the first resin layer include: polyester resins such as polyethylene terephthalate (PET) and polybutylene terephthalate (PBT); olefin resins such as polyethylene (PE) and polypropylene(PP); polyvinyl chloride resins; acrylic resins; vinyl acetate resins; amide resins; poly(ether ether ketone); and polyphenylene sulfide. A preferable example of the olefin resins may be a rolled olefin resin such as a biaxially oriented polypropylene (OPP).

Among the above, the resin material is preferably polyester resin or polyolefin resin, more preferably polyester resin or polyolefin resin, and further preferably polyethylene terephthalate (PET) or oriented polypropylene (OPP), because the pressure-sensitive adhesive sheet including the first resin layer made of such a resin material is likely to keep the deformed (bent) state and reliable attachment of the pressure-sensitive adhesive layer when the pressure-sensitive adhesive sheet is deformed (bent) along the surface shape of the adherend.

The first resin layer may be a single layer or may be composed of multiple layers.

A thickness t1 of the first resin layer is not particularly limited but may be determined as appropriate for a purpose. The thickness t1 is preferably 4 μm or more, more preferably 6 μm or more, and much more preferably 8 μm or more. The thickness T1 of the first resin layer is preferably 55 μm or less, more preferably 45 μm or less, and much more preferably 40 μm or less.

In the base, the thickness t1 of the first resin layer is preferably greater than the thickness t2 of the metal layer.

<Second Resin Layer>

The second resin layer is an optional component in the base and is disposed on the rear side of the metal layer as necessary. Like the above-described first resin layer, the second resin layer is made of resin material in a film shape. The base includes the second resin layer between the metal layer and the pressure-sensitive adhesive layer. The examples of the resin materials of the first resin layer can be used as resin material used for the second resin layer.

Among the resin materials, polyester resin or polyolefin resin is preferable, polyester resin or polyolefin resin is more preferable, and polyethylene terephthalate (PET) or oriented polypropylene (OPP) is much more preferable, because the pressure-sensitive adhesive sheet including the second resin layer made of such a resin material is likely to keep the deformed (bent) state and reliable attachment of the pressure-sensitive adhesive layer when the pressure-sensitive adhesive sheet is deformed (bent) along the surface shape of the adherend.

The second resin layer may be a single layer or may be composed of multiple layers.

A thickness t3 of the second resin layer is not particularly limited but may be determined as appropriate for a purpose. The thickness t3 is preferably 1 μm or more, more preferably 3 μm or more, and much more preferably 5 μm or more. The thickness t1 of the first resin layer is preferably 15 μm or less, more preferably 10 μm or less, and much more preferably 8 μm or less.

The second resin layer and the first resin layer may be made of the same resin material or may be made of different resin materials.

In the base, the thickness t3 of the second resin layer is preferably equal to or smaller than the thickness t1 of the first resin layer.

The pressure-sensitive adhesive sheet including the base with the second resin layer (for example, the pressure-sensitive adhesive sheet 1) and the pressure-sensitive adhesive sheet including the base without the second resin layer (for example, the pressure-sensitive adhesive sheet 1A) have excellent gas barrier properties and keep good attachment to the adherend with being deformed (bent) along the shape of the adherend.

The base preferably include the second resin layer (for example, the pressure-sensitive adhesive sheet 1). With such a configuration, adhesive agent (that is separated from the pressure-sensitive adhesive layer) is less likely to remain on the adherend when the pressure-sensitive adhesive sheet including the second resin layer is removed from the adherend for re-attachment after the first attachment to the adherend.

An upper limit value of t1/t2 that is a ratio of the thickness t1 of the first resin layer to the thickness t2 of the metal layer in the base including the second resin layer, and an upper limit value of (t1+t3)/t2 that is a ratio of the total thickness (t1+t3) of the thickness t1 of the first resin layer and the thickness t3 of the second resin layer to the thickness t2 of the metal layer in the base without including the second resin layer are preferably 8.0 or less, and more preferably 7.5 or less. A lower limit value of t1/t2 that is the ratio of the thickness t1 of the first resin layer to the thickness t2 of the metal layer in the base including the second resin layer, and a lower limit value of (t1+t3)/t2 that is the ratio of the total thickness (t1+t3) of the thickness t1 of the first resin layer and the thickness t3 of the second resin layer to the thickness t2 of the metal layer in the base without including the second resin layer are preferably 1.5 or more, and more preferably 2.0 or more, and much more preferably 2.5 or more. The pressure-sensitive adhesive sheet having the ratio of the total thickness of the resin layer (the first resin layer and the second resin layer) included in the base to the thickness t2 of the metal layer within the above range can have excellent gas barrier properties and maintain adherence to the adherend with being deformed (bent) along the shape of the adherend.

(Pressure-Sensitive Adhesive Layer)

The pressure-sensitive adhesive layer is made of acrylic adhesive including acrylic polymer as a main component. The adhesive is produced by adding additives to a mixture of the acrylic polymer and a cross-linking agent. The adhesive (solid material) includes the acrylic polymer as the main component preferably in an amount of 90% by mass or more, and more preferable in an amount of 95% by mass or more, based on the total amount of the adhesive. An upper limit amount of the acrylic polymer in the pressure-sensitive adhesive layer based on the total amount of the adhesive (solid material) is particular limited but may be preferably 99% by mass or less.

The acrylic polymer, which is a base polymer of the pressure-sensitive adhesive layer, provides adhesiveness. The acrylic polymer may be an alkyl(meth)acrylate polymer that contains alkyl(meth)acrylate (alkyl acrylate and/or alkyl methacrylate) as a main monomer component (main monomer) and further contains, where necessary, another ethylenically unsaturated monomer as a copolymerizable component (copolymerizable monomer). The alkyl(meth) acrylate and the ethylynically unsaturated monomers can be used alone or in a combination of two or more kinds.

Examples of alkyl(meth)acrylate include methyl(meth) acrylate, ethyl(meth)acrylate, propyl (meth)acrylate, isopropyl (meth)acrylate, n-butyl (meth)acrylate, isobutyl (meth) acrylate, sec-butyl (meth)acrylate, t-butyl (meth)acrylate, pentyl(meth)acrylate, isopentyl(meth)acrylate, neopentyl (meth)acrylate, hexyl(meth)acrylate, heptyl(meth)acrylate, octyl(meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Among the above, the alkyl(meth)acrylate including an alkyl group with a carbon number of 2 to 14 may be preferred. Examples thereof include ethyl(meth)

acrylates, n-butyl(meth)acrylates, isobutyl(meth)acrylates, hexyl(meth)acrylates, 2-ethylhexyl(meth)acrylates, and dodecyl(meth)acrylates.

The alkyl(meth)acrylate that is used as a main monomer component is included in 50% by mass or more (50% by mass to 100% by mass), preferably 80% by mass or more, and more preferably 90% by mass or more, based on the total mass of the monomer components. Although the upper limit of the amount of the alkyl(meth)acrylate based on the total mass of the monomer components is not particularly limited, the upper limit is preferably 99% by mass or less, and more preferably 97% by mass or less. The acrylic polymer including the alkyl(meth)acrylate in the above range can properly exhibit its properties (such as adhesiveness).

The acrylic polymer may contain, as a monomer component, a monomer component (copolymerizable monomer) that can copolymerize with alkyl(meth)acrylate. The copolymerizable monomer is contained to introduce crosslinking points into the acrylic polymer and/or to control the cohesive force of the acrylic polymer. The copolymerizable monomers can be used alone or in combination of two or more kinds.

Examples of the copolymerizable monomers include: carboxyl group-containing monomers such as (meth)acrylic acids, itaconic acid, crotonic acid, maleic acid, fumaric acid, isocrotonic acid, and anhydrides of these acids (e.g., maleic anhydride and itaconic anhydride); hydroxyl-group-containing monomers including hydroxyalkyl (meth)acrylates such as 2-hydroxyethyl (meth)acrylates, 2-hydroxypropyl (meth)acrylates, 2-hydroxybutyl (meth)acrylates, 4-hydroxybutyl (meth)acrylates, and 6-hydroxyhexyl (meth)acrylates, and vinyl alcohol and allyl alcohol; amide group-containing monomers such as (meth)acrylamides, N,N-dimethyl(meth)acrylamides, N-butyl(meth)acrylamides, N-methylol(meth)acrylamides, N-methylolpropane(meth)acrylamides, N-methoxymethyl(meth)acrylamides, and N-butoxymethyl (meth)acrylamides; amino group-containing monomers such as aminoethyl(meth)acrylates, N,N-dimethylaminoethyl (meth)acrylates, and t-butylaminoethyl (meth)acrylates; epoxy group-containing monomers such as glycidyl (meth)acrylates and methylglycidyl (meth)acrylates; cyano-containing monomers such as acrylonitrile and methacrylonitrile; monomers having a nitrogen containing ring such as N-vinyl-2-pyrrolidone, N-methyl vinyl pyrrolidone, N-vinyl pyridine, N-vinyl piperidone, N-vinyl pyrimidine, N-vinyl piperazine, N-vinyl pyrazine, N-vinyl pyrrole, N-vinyl imidazole, N-vinyl oxazole, N-vinyl morpholine, N-vinyl caprolactam, and N-(meth)acryloyl morpholine. Examples of the copolymerizable monomers further include: vinyl ester monomers such as vinyl acetate and vinyl propionate; styrenic monomers such as styrene, substituted styrenes (e.g., α-methylstyrene), and vinyltoluene; olefinic monomers such as ethylene, propylene, isoprene, butadiene, and isobutylene; vinyl chloride, vinylidene chloride; isocyanate group-containing monomers such as 2-(meth)acryloyloxyethyl isocyanate; alkoxy-group-containing monomers such as methoxyethyl (meth)acrylates and ethoxyethyl (meth)acrylates; vinyl ether monomers such as methyl vinyl ether and ethyl vinyl ether. Further examples of the copolymerizable monomer includes polyfunctional monomers such as 1,6-hexanediol di(meth)acrylates, butanediol di(meth)acrylates, ethylene glycol di(meth)acrylates, diethylene glycol di(meth)acrylates, triethylene glycol di(meth)acrylates, tetraethylene glycol di(meth)acrylates, (poly)ethylene glycol di(meth)acrylates, propylene glycol di(meth)acrylates, (poly)propylene glycol di(meth)acrylates, neopentyl glycol di(meth)acrylates, pentaerythritol di(meth)acrylates, trimethylolpropane tri(meth)acrylates, pentaerythritol tri(meth)acrylates, dipentaerythritol hexa(meth)acrylates, glycerol di(meth)acrylate, epoxy acrylates, polyester acrylates, urethane acrylates, and divinylbenzene. The copolymerizable monomer is preferably (meth)acrylic acids, itaconic acid, maleic acid, hydroxyethyl (meth)acrylates, hydroxybutyl (meth)acrylates, or hydroxyhexyl (meth)acrylates.

The amount of copolymerizable monomers can be suitably determined according to the types of monomer components so as to be less than 50% by mass based on the total weight of monomer components.

For example, when carboxyl group-containing monomer (especially, acrylic acid) is used as the copolymerizable monomer, the amount of the carboxyl group-containing monomer (a lower limit value) is preferably 3% by mass or more, more preferably 5% by mass or more, and much more preferably 7% by mass or more, based on 100% by mass of the total monomer components. The amount of the carboxyl group-containing monomer (au upper limit value) is preferably 10% by mass or less, more preferably 9% by mass or less, and much more preferably 8% by mass or less, based on 100% by mass of the total monomer components.

For example, when hydroxyl-group-containing monomer (especially, 4-hydroxybutyl acrylate) is used as the copolymerizable monomer, the amount of the hydroxyl-group-containing monomer (a lower limit value) is preferably 0.07% by mass or more, more preferably 0.08% by mass or more, and much more preferably 0.09% by mass or more, based on 100% by mass of the total monomer components. The amount of the hydroxyl-group-containing monomer (au upper limit value) is preferably 3% by mass or less, more preferably 1% by mass or less, and much more preferably 0.5% by mass or less, based on 100% by mass of the total monomer components.

The acrylic polymer can be produced through polymerization of the above-described monomer components by a known polymerization method (technique). Examples of the polymerization method include solution polymerization, emulsion polymerization, mass polymerization, and ultraviolet irradiation. The solution polymerization is preferable in view of cost and mass production. In the polymerization of the acrylic polymer, known components such as a polymerization initiator, a chain transfer agent, an emulsifier, and a solvent that are proper in the polymerization can be used.

Azo initiators are preferred as polymerization initiators used in the polymerization of the acrylic polymer through the solution polymerization. Examples of the azo initiators include 2,2'-azobisisobutyronitrile (hereinafter, AIBN), 2,2'-azobis-2-methylbutyronitrile (hereinafter, AMBN), dimethyl 2,2'-azobis(2-methylpropionate), and 4,4'-azobis-4-cyanovalerianic acid. The amount of the azo initiators is 0.05 to 0.5 parts by mass, more preferably 0.1 to 0.3 parts by mass, based on the total amount of the monomer component (100 parts by mass).

Solvents used in the polymerization of the acrylic polymer through the solution polymerization can be known organic solvents. Examples of the solvents include: ester solvents such as ethyl acetate and methyl acetate; ketone solvents such as acetone and methyl ethyl ketone; alcohol solvents such as methanol, ethanol, and butanol; hydrocarbon solvents such as cyclohexane, hexane, and heptane; aromatic solvents such as toluene and xylene. The organic solvents can be used alone or in combination of two or more kinds.

The weight-average molecular weight of the acrylic polymers is preferably 300,000 to 2,000,000, more preferably 600,000 to 1,500,000, and more preferably 700,000 to 1,500,000. The acrylic polymer having the weight-average molecular weight in the above range can exhibit proper adhesiveness and coating properties. The above weight-average molecular weight can be controlled by types and amounts of polymerization initiators, the temperature and duration of polymerization process, and further the monomer concentration and the dropwise addition rate of monomers.

The crosslinking agent is included in the acrylic adhesive to control the gel fraction (ratio of solvent-insoluble components) of the pressure-sensitive adhesive layer. Examples of the cross-linking agents include isocyanate cross-linking agents, epoxy crosslinking agents, melamine crosslinking agents, peroxide cross-linking agents, urea crosslinking agents, metal alkoxide crosslinking agents, metal chelate crosslinking agents, metal salt crosslinking agents, carbodiimide crosslinking agents, oxazoline crosslinking agents, aziridine crosslinking agents, and amine crosslinking agents. The isocyanate crosslinking agents are preferred as essential crosslinking agents, and are more preferably used in together with the epoxy cross-linking agents. The crosslinking agents can be used alone or in a combination of two or more kinds.

Examples of the isocyanate crosslinking agents include: lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, hydrogenated xylene diisocyanate, and hydrogenated xylylene diisocyanate; aromatic polyisocyanates such as 2,4-tolylene diisocyanate, 2-6-tolylen diisocyanate, 4,4'-diphenylmethane diisocyanate, and xylylene diisocyanate. In addition to the above, examples of the isocyanate crosslinking agent include trimethylolpropane/tolylene diisocyanate adduct (available from Nippon Polyurethane Industry Co., Ltd. under the trade name CORONATE L,) and trimethylolpropane/hexamethylene diisocyanate adduct (available from Nippon Polyurethane Industry Co., Ltd. under the trade name CORONATE HL).

Examples of the epoxy cross-linking agents include: N,N,N',N'-tetraglycidyl-m-xylene diamine, diglycidylaniline, 1,3-bis(N,N-glycidylaminomethyl)cyclohexane, 1,6-hexanediol glycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, adipic acid diglycidyl ester, o-phthalic acid diglycidyl ester, triglycidyl-tris(2-hydroxyethyl)isocyanurate, resorcin diglycidyl ether, and bisphenol-S-diglycidyl ether. In addition to the above, examples of the epoxy cross-linking agents include epoxy resins each having two or more epoxy groups per molecule.

The amount (an upper limit value) of the cross-linking agents in the adhesive is preferably 3.5 parts by mass or less, more preferably 2.5 parts by mass, based on 100% by mass of the acrylic polymer. The amount (a lower limit value) of the cross-linking agents in the adhesive is preferably 1 parts by mass or more, and more preferably 1.5 parts by mass or more, based on 100 parts by mass of the acrylic polymer.

The amount (an upper limit value) of the isocyanate cross-linking agents is preferably 3 parts by mass or less, and more preferably 2.5 parts by mass or less, based on 100 parts by mass of the acrylic polymer. The amount (a lower limit value) of the isocyanate cross-linking agents is preferably 1 part by mass or more, and more preferably 1.5 parts by mass or more, based on 100 parts by mass of the acrylic polymer.

In addition to the above components, the acrylic adhesive may include known additives as necessary as long as the object of the present invention can be achieved. Examples of the additives includes age inhibitors, fillers, colorants (such as pigments and dyes), ultraviolet ray absorbing agents, antioxidants, plasticizing agents, softeners, surfactants, and antistatic agents.

The method of forming the pressure-sensitive adhesive layer of the pressure-sensitive adhesive sheet is not particularly limited. The method may be any known method of forming a pressure-sensitive adhesive layer. An example of the method includes applying the above-described adhesive (or adhesive solution) on a predetermined surface (a surface of the base, for example) such that a dried adhesive has a predetermined thickness. Then, the adhesive is dried or cured as necessary (a direct application technique). Another example of the method includes applying the adhesive (or the adhesive solution) on a release linear such that a dried adhesive has a predetermined thickness. Then, the adhesive is dried or cured as necessary to obtain the pressure-sensitive adhesive layer 3, and the pressure-sensitive adhesive layer is transferred on the predetermined surface (the surface of the base, for example)(a transfer technique). The adhesive (or the adhesive solution) may be applied by a known coater such as a gravure coater, a reverse coater, a kiss roll coater, a dip roll coater, a bar coater, a knife coater, and a spray coater.

The thickness T2 of the pressure-sensitive adhesive layer is not particularly limited and may be determined as appropriate for a purpose. For example, the thickness T2 (a lower limit value) is preferably 12 μm or more, more preferably 13 μm or more, much more preferably 14 μm or more. The thickness (an upper limit value) of the pressure-sensitive adhesive layer is preferably 55 μm or less, more preferably 50 μm or less, much more preferably 47 μm or less.

The pressure-sensitive adhesive sheet including the pressure-sensitive adhesive layer having the thickness T2 within the above range can have excellent gas barrier properties and excellent repulsion resistance that keeps close adhesion to an adherend with being deformed (bent) along a shape of the adherend. The pressure-sensitive adhesive layer may have a single layer or may be composed of multiple layers.

The loss elastic modulus G" (a lower limit value) of the pressure-sensitive adhesive layer at 70° C. is not particularly limited but may be preferably $5 \times 10^3$ Pa or more, more preferably $3 \times 10^4$ Pa or more, much more preferably $4 \times 10^4$ Pa or more, and further more preferably $4.5 \times 10^4$ Pa or more. The loss elastic modulus G" (an upper limit value) of the pressure-sensitive adhesive layer at 70° C. is not particularly limited but may be preferably $5 \times 10^5$ Pa or less. The pressure-sensitive adhesive sheet including the pressure-sensitive adhesive layer having the loss elastic modulus G" within the above range can have excellent gas barrier properties and excellent repulsion resistance that keeps close adhesion to an adherend with being deformed (bent) along a shape of the adherend. The loss elastic modulus G" of the pressure-sensitive adhesive layer at 70° C. is obtained by a measuring method described below.

Probe tackiness of the pressure-sensitive adhesive layer is not particularly limited but may be 120 kN/m$^2$ or more. The pressure-sensitive adhesive sheet including the pressure-sensitive adhesive layer having probe tackiness of such a range has excellent gas barrier properties and excellent repulsion resistance that keeps close adhesion to an adherend with being deformed (bent) along a shape of the adherend. The probe tackiness of the pressure-sensitive adhesive layer is measured by a measuring method described below.

The gel fraction (ratio of solvent-insoluble components) of the pressure-sensitive adhesive layer is not particularly limited but may be preferably 10 mass % or more as a lower limit value, more preferably 20 mass % or more, and much more preferably 30 mass %. An upper limit value of the gel fraction (ratio of solvent-insoluble components) may be preferably 90 mass % or less, more preferably 80 mass % or less, and much more preferably 70 mass % or less. The pressure-sensitive adhesive sheet including the pressure-sensitive adhesive layer having the gel fraction of such a range has excellent gas barrier properties and excellent repulsion resistance that keeps close adhesion to an adherend with being deformed (bent) along a shape of the adherend.

The gel fraction is meant to a ratio of solvent-insoluble components in the pressure-sensitive adhesive and is obtained by a method of measuring gel fraction of pressure-sensitive adhesive.

The gel fraction is obtained as follows. Pressure-sensitive adhesive is sampled and accurately weighed and a mass of the pressure-sensitive adhesive before immersion is obtained. Next, the pressure-sensitive adhesive sample is immersed in 40 g of ethyl acetate for seven days. Then, all insoluble matters in the ethyl acetate is recovered and is dried at 130° C. for two hours and obtain dry mass of the insoluble matters. The gel fraction is obtained by plugging the obtained values in the following equation.

Solvent-insoluble matters in the pressure-sensitive adhesive (weight %)=(dry mass of insoluble matters/mass of pressure-sensitive adhesive before immersion)×100

A ratio T2/T1 (a lower limit value) of a thickness T2 of the pressure-sensitive adhesive layer to a total thickness T1 of the base is not particularly limited but may be determined appropriately for a purpose. The ratio T2/T1 (the lower limit value) is preferably 0.2 or more, more preferably 0.3 or more, and much more preferably 0.4 or more. The ratio T2/T1 (an upper limit value) is preferably 2.5 or less, more preferably 2.0 or less, and much more preferably 1.8 or less.

The pressure-sensitive adhesive sheet having the ratio Ta/Tb within the above range has excellent gas barrier properties and excellent repulsion resistance that keeps close adhesion to an adherend with being deformed (bent) along a shape of the adherend.

(Release Liner)

In the pressure-sensitive adhesive sheet before use, a surface (an adhesive surface) of the pressure-sensitive adhesive layer is protected by a release liner. The release liner may be one selected from known release liners. A non-silicone release liner is preferably used when the pressure-sensitive adhesive sheet is attached to a hard disk drive (the magnetic disk drive) because a siloxane compound (siloxane gas) such as cyclic siloxane is less likely to be generated.

Any non-silicone release liner that does not include a silicone release agent can be used. Examples of the non-silicone release liner include a base member including a release layer such as a plastic film and a sheet subjected to a surface treatment using a release agent such as long-chain alkyl, fluorine, molybdenum sulfide release agents; a low-adhesive base member including fluorinated polymers such as polytetrafluoroethylene, polychlorotrifuruoroethylene, polyvinyl fluoride, polyvinylidene fluoride, tetrafluoroethylene hexafluoropropylene copolymers, chlorofluoroethylene vinylidene fluoride copolymers; and a low-adhesive base member including non-polar polymers such as olefin resins (e.g., polyethylene, polypropylene). The release liner (polyolefin release liner) including a film layer made of olefin resin on a release treatment surface side is preferred. The release liner (polyethylene release liner) including a film layer made of polyethylene on the release treatment surface side is more preferred. The polyolefin release liner may be a multilayer film of a polyester resin and a polyolefin resin as long as the polyolefin resin provides the surface to be in contact with the adhesive surface.

(Properties of the Pressure-Sensitive Adhesive Sheet)

The pressure-sensitive adhesive sheet hardly allows moisture to pass therethrough and hardly allows siloxane compound such as cyclic siloxane to pass therethrough and hardly allows gas compounds such as low density gas (helium, for example) to pass therethrough (gas barrier properties, gas permeation suppression). The moisture and the gas compounds such as helium are considered to travel inside the pressure-sensitive adhesive layer, not in the thickness direction of the pressure-sensitive adhesive sheet (the base).

The pressure-sensitive adhesive sheet has excellent repulsion resistance that keeps close adhesion to an adherend with being deformed (bent) along a shape of the adherend. For example, if the pressure-sensitive adhesive sheet is attached to an adherend that has two adjacent faces forming a corner portion so as to cover the corner portion, the pressure-sensitive adhesive sheet can be attached to the adherend with being deformed along the shape of the adherend having the corner portion. Therefore, an edge portion of the pressure-sensitive adhesive sheet is less likely to be separated and lifted up from the adherend.

The pressure-sensitive adhesive sheet has followability to uneven surface of the adherend (followability to difference in level). The pressure-sensitive adhesive sheet also has properties such as rigidity, workability (handleability), preservation stability, and endurance.

The pressure-sensitive adhesive sheet is subjected to a peel test with a constant load (at 70° C. for one hour), which will be described later, and the result of the peel test (a peel amount, a peel distance) is preferably 2 mm or less, more preferably 1.5 mm or less, and much more preferably 1 mm or less. The pressure-sensitive adhesive sheet is normally used at a temperature of 70° C. or less. Therefore, the pressure-sensitive adhesive sheet having the results of the peel test with a constant load at 70° C. within the above range has effective adhesive force with respect to the adherend.

The pressure-sensitive adhesive sheet is subjected to a repulsion resistance test (at 70° C. for 24 hours), which will be described later, and the result of the repulsion resistance test (a total height of lifting) is preferably 2 mm or less, more preferably 1.5 mm or less, much more preferably 1 mm or less, and further more preferably 0 mm. As described before, the pressure-sensitive adhesive sheet is normally used at a temperature of 70° C. or less. Therefore, the pressure-sensitive adhesive sheet having the results of the repulsion resistance test at 70° C. within the above range has excellent repulsion resistance properties.

The pressure-sensitive adhesive sheet has a result of a moisture permeation test (a moisture permeation rate), which will be described layer, is preferably 0.1 (g/m$^2$/24 h) or less.

The pressure-sensitive adhesive sheet has sticking strength of preferably 1.0 N/sqmm or more, and more preferably 2.0 N/sqmm or more. The sticking strength is measured with a measurement method described below.

The pressure-sensitive adhesive sheet has a tearing strength of preferably 100 mN or more, and more preferably 200 mN or more. The tearing strength is measured with a measurement method described below.

(Application of the Pressure-Sensitive Adhesive Sheet)

Figure 3:
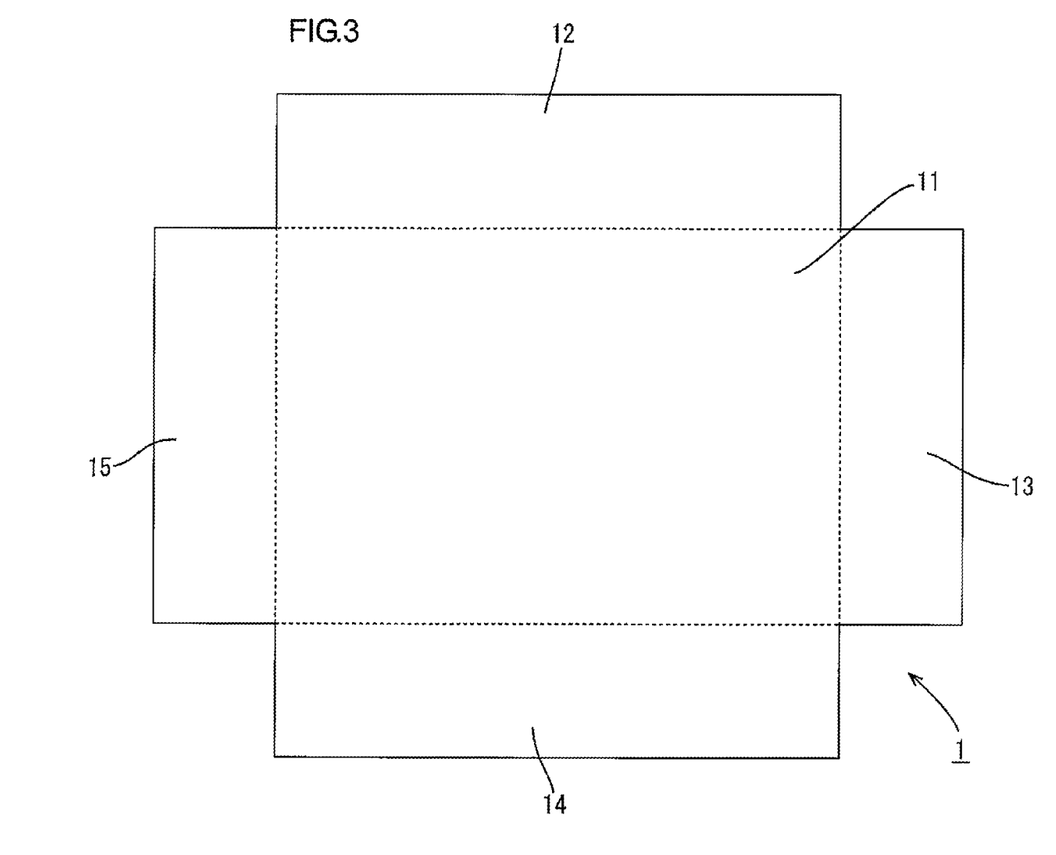
FIG. 3 is a plan view of a pressure-sensitive adhesive sheet used as a cover seal.
Figure 4:
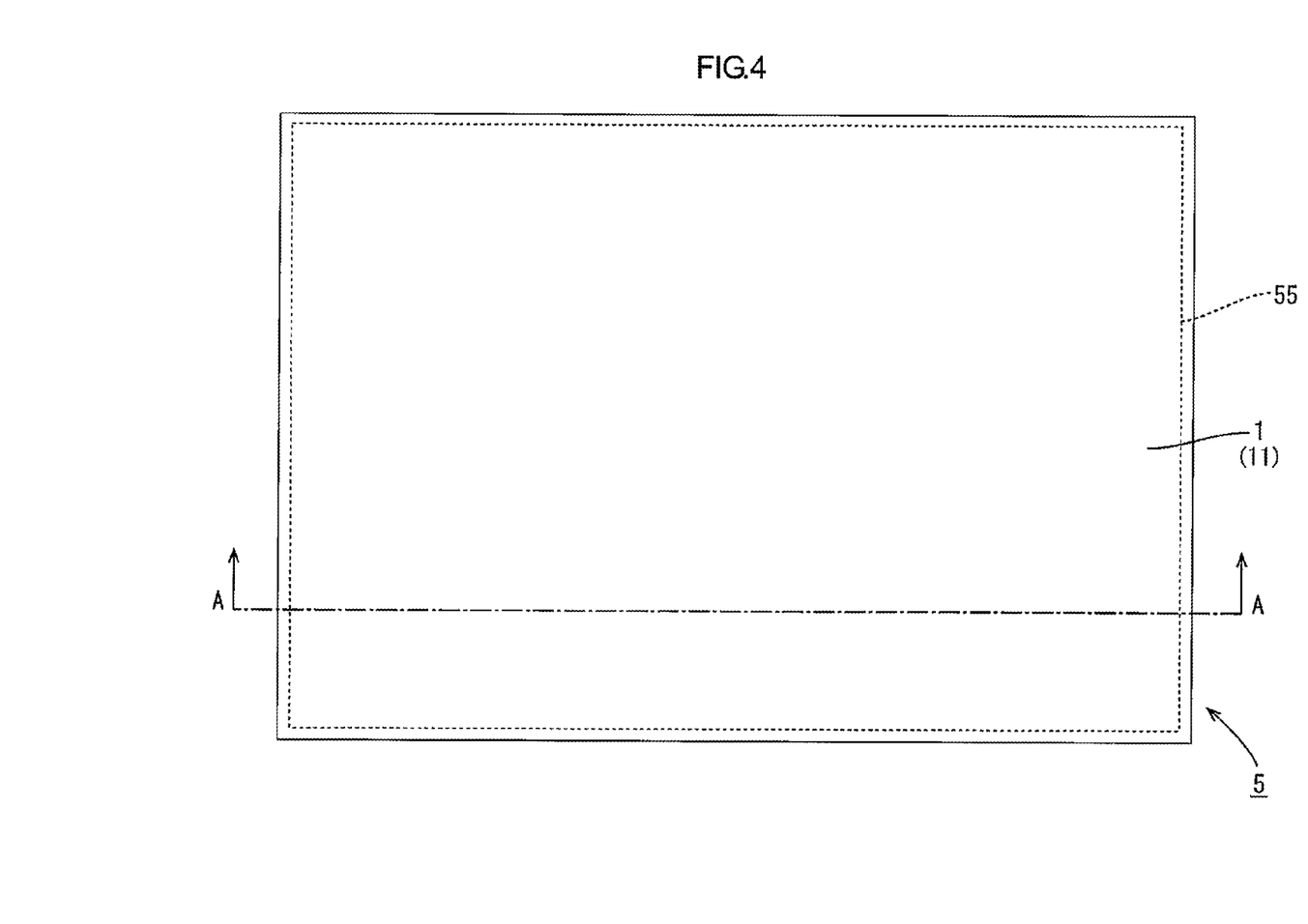
FIG. 4 is a plan view of a hard disk drive including a pressure-sensitive adhesive sheet on an upper surface thereof.
Figure 5:
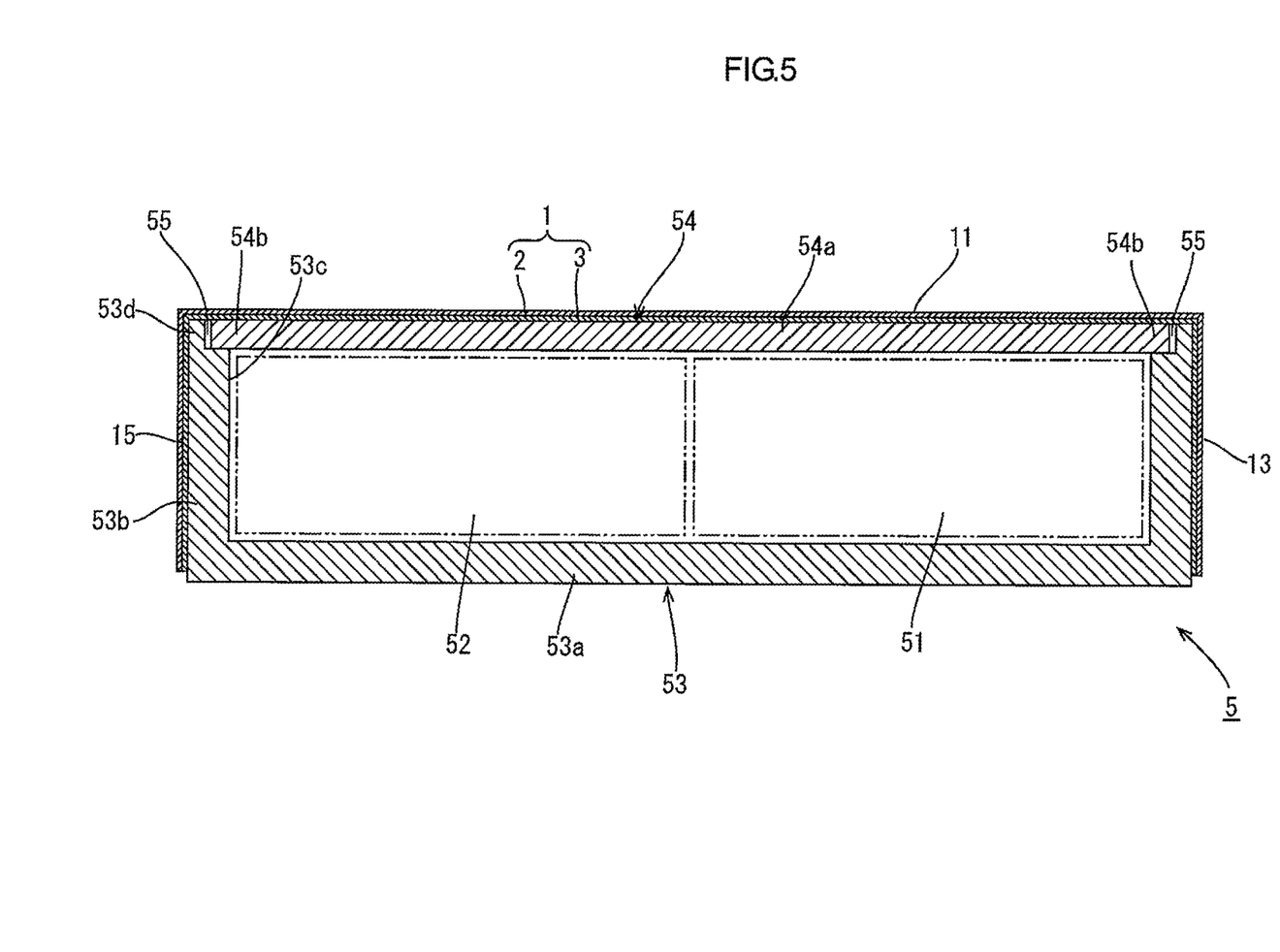
FIG. 5 is a cross-sectional view typically illustrating a configuration of the hard disk drive.

The pressure-sensitive adhesive sheet is used as a cover seal that is to be attached to the hard disk drive to provide the air tightness to the hard disk drive (the magnetic disk drive) 5. A plan view of the pressure-sensitive adhesive sheet 1 used as a cover seal is illustrated in FIG. 3. Plan view of the hard disk drive 5 on which the pressure-sensitive adhesive sheet 1 is attached is illustrated in FIG. 4. A cross-sectional view of a configuration of the hard disk drive 5 is schematically illustrated in FIG. 5. FIG. 5 illustrates a cross-sectional view taken along line A-A in FIG. 4.

As illustrated in FIG. 3, the pressure-sensitive adhesive sheet 1 for a cover seal includes a rectangular seal main portion 11 and four extended portions 12, 13, 14, 15. The seal main portion 11 is attached to an upper surface of the hard disk drive 5. The four extended portion 12, 13, 14, 15 extend from respective four side edges (peripheral edges) of the seal main portion 11 and are attached to respective side surfaces of the hard disk drive 5. The extended portions 12, 14 are elongated along respective long side edges of the seal main portion 11 and the extended portions 13, 15 are elongated along respective short side edges of the seal main portion 11. Each extended portion has a rectangular shape.

A configuration of the hard disk drive 5 will be described. As illustrated in FIG. 5, the hard disk drive 5 includes a magnetic disk unit 51, a base member 53, and a cover (a top cover) 54. The magnetic disk unit 51 includes a magnetic disk and a spindle motor. The base member 53 has a box-like shape and houses a head unit 52 including a magnetic head that configured to read or write information from or on the magnetic disk. The cover 54 is attached to the base member 53. The base member 53 is made of metal material such as SUS defined in JIS and has an open topped box like shape as a whole. Specifically, the base member 53 includes a bottom plate 53a and a peripheral wall 53b that extend in a vertical direction from a periphery of the bottom plate 53a. The base member 53 houses the magnetic disk unit 51 and the head unit 52 in a space defined by the bottom plate 53a and the peripheral wall 53b. The peripheral wall 53b includes an end portion (hereinafter, a frame-like end portion) 53d having a frame-like shape and extending along an opening 53c.

The cover 54 has a plate-like shape as a whole and is made of metal material such as SUS. The cover 54 includes a body 54a having a rectangular plate-like shape in a plan view. The cover 54 is attached to the base member 53 such that a peripheral edge (outer peripheral edge) of an end portion 54b included in the body 54a (the cover 54) faces the inner peripheral edge of the frame-like end portion 53d. The cover 54 covers the opening 53c of the base member 53 like a drop lid. A space defined by the cover 54 and the base member 53 is supplied with low density gas such as helium gas via a supply inlet (not illustrated) in the base member 53. The supply inlet includes a check valve.

A small gap 55 is provided between the inner peripheral edge of the frame-like end portion 53d and the outer peripheral edge of the cover 54. In this embodiment, an upper surface of the frame-like end portion 53d and an upper surface of the cover 54 are flush with each other. According to other embodiments, the upper surface of the cover 54 may be a concave-convex surface. According to other embodiments, the upper surface of the frame-like end portion 53d and the upper surface of the end portion 54b of the cover 54 may not be flush with each other and may have a gap therebetween.

The pressure-sensitive adhesive sheet 1 of this embodiment is attached to the hard disk drive 5 such that the adhesive surface of the seal main portion 11 covers an entire upper surface of the cover 54 (the body 54a) and an upper surface of the frame-like end portion 53d. The gap 55 provided between the inner peripheral edge of the frame-like end portion 53d and the outer peripheral edge of the cover 54 is covered by the end portion (a peripheral portion) of the seal main portion 11. The seal main portion 11 of the pressure-sensitive adhesive sheet 1 is attached to both of the frame-like end portion 53d and the cover 54 (the end portion 54b) so as to cover the gap 55 provided between the inner peripheral edge of the frame-like end portion 53d and the outer peripheral edge of the cover 54.

The extended portions 12, 13, 14, 15 of the pressure-sensitive adhesive sheet 1 are attached to the respective side surfaces of the base member 53 (outer wall surfaces of the peripheral walls 53b).

As illustrated in FIG. 5, the pressure-sensitive adhesive sheet 1 is attached to the hard disk drive 5 so as to be bent (deformed) along the upper surface and the side surfaces of the hard disk drive 5. Thus, the corner portion defined by the upper surface (the upper surface of the cover 54 and the upper surface of the base member 53) and the side surfaces (the side surfaces of the base member 53) of the hard disk drive 5 is covered with the pressure-sensitive adhesive sheet 1.

In the pressure-sensitive adhesive sheet 1, the peripheral portion of the seal main portion 11 covers the small gap 55 in the upper surface of the hard disk drive 5. The extended portions extend outwardly from the peripheral portion of the seal main portion 11. The extended portions are attached to the side surfaces of the hard disk drive 5 (the side surfaces of the base member 53). The side surfaces of the hard disk drive 5 are adjacent to the upper surface of the hard disk drive 5. Namely, a distance between the gap 55 in the upper surface of the hard disk drive 5 and the edge of the pressure-sensitive adhesive sheet 1 (an edge of the extended portion) is greater than the distance in a rectangular cover seal including only the seal main portion 11 by the length of the extended portion.

If the distance between the gap 55 and the edge of the pressure-sensitive adhesive sheet is long, the distance by which gas in the hard disk drive 5 travels within the pressure-sensitive adhesive layer 3 before being released outside is long. On the contrary, if external gas enters the hard disk drive 5, the distance by which gas in the hard disk drive 5 travels within the pressure-sensitive adhesive layer 3 is long. Thus, the distance by which the gas travels between the inside and the outside of the hard disk drive 5 is long, and the gas barrier properties of the pressure-sensitive adhesive sheet 1 are improved.

As described before, the pressure-sensitive adhesive sheet 1 has excellent repulsion resistance that keeps close adhesion to the hard disk drive 5 (an adherend) with being deformed (bent) along a shape of the hard disk drive 5 (the adherend). Therefore, an edge portion of the pressure-sensitive adhesive sheet 1 is less likely to be separated and lifted up from the hard disk drive 5 (the adherend). In the pressure-sensitive adhesive sheet 1, gas travels between the inside and the outside (an external space) of the hard disk drive 5 by a long distance.

Particularly, the pressure-sensitive adhesive sheet 1 has relatively good gas barrier properties and good repulsion resistance at a high temperature (for example, 70° C.).

The cover 54 includes holes (not illustrated) for receiving components or operations of writing data and the holes are collectively covered with the seal main portion 11 of the pressure-sensitive adhesive sheet 1.

The pressure-sensitive adhesive sheet is not only used as the above-described cover seal, but may also be shaped into a predetermined shape and used to cover various holes (openings) of the cover 54 of the hard disk drive 5.

The pressure-sensitive adhesive sheet can be attached to an adherend having a flat surface or an adherend having an concave-convex surface.

The inventors of the present invention conducted an intensive study and found that the following pressure-sensitive adhesive sheet has excellent gas barrier properties and excellent repulsion resistance that keeps close adhesion to an adherend with being bent along a shape of the adherend. The pressure-sensitive adhesive sheet includes a pressure-sensitive adhesive layer having an adhesive surface on a rear side thereof, the adhesive surface being attached to an adherend, and a base including a metal layer disposed on a front side with respect to the adhesive layer and a resin layer disposed on a front side with respect to the metal layer. A product of an initial elastic modulus of the base and a total thickness of the base is 3000 N/mm or less, and a separation distance is 2 mm or less, and the separation distance is measured with a peel test with a constant load as follows: a test piece of the pressure-sensitive adhesive sheet having a width of 10 mm and a length of 100 mm is attached to a surface of a test plate made of stainless steel plate such that the adhesive surface is attached to the surface of the test plate and then, the test plate is left standing at a temperature of 23° C. for twenty four hours and then, a load of 100 gf is applied to one end of a length dimension of the test piece vertical to the surface of the test plate and a separation distance of the test piece is measured after one hour.

In the pressure-sensitive adhesive sheet, a loss elastic modulus G" of the pressure-sensitive adhesive layer at 70° C. may be $5 \times 10^3$ Pa or more.

In the pressure-sensitive adhesive sheet, the pressure-sensitive adhesive layer may have probe tackiness of 120 kN/m$^2$ or more.

In the pressure-sensitive adhesive sheet, the pressure-sensitive adhesive layer may have a thickness T2 of 12 μm or more.

In the pressure-sensitive adhesive sheet, the thickness T2 of the pressure-sensitive adhesive layer may be greater than a thickness t2 of the metal layer.

In the pressure-sensitive adhesive sheet, a ratio of a total thickness of the resin layer and another resin layer other than the resin layer included in the base to a thickness t2 of the metal layer may be from 1.5 to 8.0.

In the pressure-sensitive adhesive sheet, a ratio T2/T1 of a thickness T2 of the pressure-sensitive adhesive layer to a total thickness T1 of the base may be from 0.2 to 2.5.

In the pressure-sensitive adhesive sheet, the base may include another resin layer between the pressure-sensitive adhesive layer and the metal layer.

In the pressure-sensitive adhesive sheet, the other resin layer has a thickness t3 that is equal to or smaller than the thickness t1 of the resin layer.

The pressure-sensitive adhesive sheet may be used as a cover seal for a magnetic disk drive.

A magnetic disk drive according to the present technology includes a magnetic disk unit including a magnetic disk, a head unit including a magnetic head configured to read or write information on the magnetic disk, a base member having a box like shape with an opening at one side and including a frame shaped end portion extending around the opening, the base member housing the magnetic disk unit and the head unit therein, a cover attached to the base member and covering the opening of the base member, the cover having an outer peripheral portion surrounded by an inner peripheral portion of the frame shaped end portion, and a cover seal that is the pressure-sensitive adhesive sheet and includes a seal main portion attached over the frame shaped end portion and the cover such that the cover seal covers a gap between the inner peripheral portion of the frame shaped end portion and the outer peripheral portion of the cover, and an extended portion extending from a peripheral edge of the seal main portion and attached to a side surface of the base member, and the cover seal is attached to an upper surface of the cover and an upper surface and the side surface of the base with being bent along the upper surfaces and the side surface.

According to an aspect of the present invention, the problems of known pressure-sensitive adhesive sheets can be resolved and a pressure-sensitive adhesive sheet having excellent gas barrier properties and excellent repulsion resistance can be provided. With the excellent repulsion resistance, the pressure-sensitive adhesive sheet can keep close adhesion to an adherend with being bent along a shape of the adherend. Further, according to another aspect of the present invention, a magnetic disk drive to which the pressure-sensitive adhesive sheet is attached is provided.

EXAMPLES

Hereinafter, the present invention will be described based on examples. The present invention is not limited to the examples.

Example 1

Production of a Base (a)

A base (a) having a three-layer structure was produced by a dry laminating method. The base (a) sequentially includes a first PET film that has a thickness of 9 μm, an aluminum layer that has a thickness of 7 μm, and a second PET layer that has a thickness of 9 μm from the front side. The produced base (a) had a total thickness of 30 μm.

(Preparation of Adhesive Composition Solution I)

Solution polymerization of 93 parts by mass of butyl acrylate, 7 parts by mass of acrylic acid, and 0.1 parts by mass of 4-hydroxybutyl acrylate were carried out according to a common procedure in ethyl acetate, which is a solvent, in the presence of 0.1 part by mass of azobisisobutyronitrile, which is an initiator. Thus, a solution (solid concentration of 25% by mass) of an acrylic polymer having a weight-average molecular weight of 1,500,000 was prepared. To the solution, 2 parts by mass (in terms of solids content) of the isocyanate crosslinking agent (available from Nippon Polyurethane Industry Co., Ltd. under the trade name CORONATE L, tolylene diisocyanate adduct of trimethylolpropane with a solids concentration of 75% by mass) was added based on 100 parts by mass of the acrylic polymer, and thus an adhesive composition solution I was obtained.

(Production of Pressure-Sensitive Adhesive Sheet)

The adhesive composition solution I was applied onto the second PET film layer on the rear side of the base (a) such that the dried adhesive composition solution has a thickness of 15 μm. Then, the adhesive composition solution was dried at 120° C. for three minutes to obtain a pressure-sensitive adhesive layer on the base (a). Then, a release liner (available from Sun A. Kaken Co., Ltd. under the trade name SFL-70T2, 70 µm) that is made of a release processed and embossing processed thermoplastic film is attached to a surface of the pressure-sensitive adhesive layer, and thus the pressure-sensitive adhesive sheet with a release liner of Example 1 was obtained.

Example 2

A pressure-sensitive adhesive sheet with a release liner of Example 2 was produced in the same manner as Example 1, except that the adhesive composition solution I was applied onto the second PET film layer on the rear side of the base (a) such that the dried adhesive composition solution has a thickness of 30 µm.

Example 3

A pressure-sensitive adhesive sheet with a release liner of Example 3 was produced in the same manner as Example 1, except that the adhesive composition solution I was applied onto the second PET film layer on the rear side of the base (a) such that the dried adhesive composition solution has a thickness of 45 µm.

Example 4

A base (b) having a three-layer structure was produced in the same manner as Example 1, except that the thickness of the first PET film layer on the front side was changed to 25 µm. The total thickness of the produced base (b) was 46 µm. The adhesive composition solution I that is the same one as used in Example 1 was applied onto the second PET film layer on the rear side of the base (b) such that the dried adhesive composition solution I has a thickness of 30 µm. Then, the adhesive composition solution I was dried at 120° C. for three minutes to obtain a pressure-sensitive adhesive layer on the base (b). In addition, the release liner same as one in Example 1 was attached to a surface of the pressure-sensitive adhesive layer, and thus the pressure-sensitive adhesive sheet with the release liner of Example 4 was obtained.

Example 5

A base (c) having a three-layer structure was produced by a dry laminating method. The base (c) sequentially includes a first OPP film that has a thickness of 30 µm, an aluminum layer that has a thickness of 7 µm, and a second OPP layer that has a thickness of 9 µm from the front side. The produced base (c) had a total thickness of 51 µm.

The adhesive composition solution I was applied onto the second OPP film layer on the rear side of the base (c) such that the dried adhesive composition solution has a thickness of 30 µm. Then, the adhesive composition solution I was dried at 120° C. for three minutes to obtain a pressure-sensitive adhesive layer on the base (c). Then, the release liner similar to that in Example 1 is attached to a surface of the pressure-sensitive adhesive layer, and thus the pressure-sensitive adhesive sheet with a release liner of Example 5 was obtained.

Example 6

A base (d) having a three-layer structure was produced in the same manner as in Example 5, except that the thickness of the first OPP film layer on the front side was changed to 40 µm. The total thickness of the produced base (d) was 61 µm. Then, a pressure-sensitive adhesive layer that has a thickness of 30 µm is formed on the second OPP film layer on the rear side of the base (d) in the same manner as Example 5. In addition, the release liner similar to that in Example 5 was attached to a surface of the pressure-sensitive adhesive layer, and thus the pressure-sensitive adhesive sheet with the release liner of Example 6 was obtained.

Example 7

A base (e) having a three-layer structure was produced in the same manner as in Example 5, except that the thickness of the second OPP film layer on the rear side was changed to 4.5 µm. The total thickness of the produced base (e) was 46.5 µm. Then, a pressure-sensitive adhesive layer that has a thickness of 30 µm was formed on the second OPP film layer on the rear side of the base (e) in the same manner as in Example 5. In addition, the release liner similar to that in Example 5 was attached to a surface of the pressure-sensitive adhesive layer, and thus the pressure-sensitive adhesive sheet with the release liner of Example 7 was obtained.

Example 8

A base (f) having a three-layer structure was produced in the same manner as in Example 5, except that the thickness of the first OPP film layer on the front side was changed to 40 µm and the thickness of the second OPP film layer on the rear side was changed to 4.5 µm. Then, a pressure-sensitive adhesive layer that has a thickness of 30 µm is formed on the second OPP film layer on the rear side of the base (f) in the same manner as Example 5. In addition, the release liner similar to that in Example 5 was attached to a surface of the pressure-sensitive adhesive layer, and thus the pressure-sensitive adhesive sheet with the release liner of Example 7 was obtained.

Example 9

A base (g) having a two-layer structure was produced by a dry laminating method. The base (g) sequentially includes a PET film that has a thickness of 38 µm and an aluminum layer that has a thickness of 7 µm from the front side. The produced base (g) had a total thickness of 47.5 µm.

The adhesive composition solution I was applied onto the aluminum layer on the rear side of the base (g) such that the dried adhesive composition solution has a thickness of 30 µm. Then, the adhesive composition solution was dried at 120° C. for three minutes to obtain a pressure-sensitive adhesive layer on the base (g). Then, the release liner same as that in Example 1 is attached to a surface of the pressure-sensitive adhesive layer, and thus the pressure-sensitive adhesive sheet with a release liner of Example 9 was obtained.

Comparative Example 1

A base (h) having a three-layer structure was produced in the same manner as in Example 1, except that the thickness of the first PET film layer on the front side was changed to 38 µm. The total thickness of the produced base (h) was 59 µm. The adhesive composition solution I that is the same one as used in Example 1 was applied onto the second PET film layer on the rear side of the base (h) such that the dried adhesive composition solution has a thickness of 30 µm. Then, the adhesive composition solution was dried at 120° C. for three minutes to obtain a pressure-sensitive adhesive layer on the base (h). In addition, the release liner same as one in Example 1 was attached to a surface of the pressure-sensitive adhesive layer, and thus the pressure-sensitive adhesive sheet with the release liner of Comparative Example 1 was obtained.

Comparative Example 2

A base (i) having a three-layer structure was produced in the same manner as in Example 1, except that the thickness of the first PET film layer on the front side was changed to 50 µm. The total thickness of the produced base (i) was 71 µm. Then, a pressure-sensitive adhesive layer having a thickness of 30 µm was formed on the second PET film layer on the rear side of the base (i) in the same manner as in Comparative Example 1. In addition, the release liner same as one in Comparative Example 1 was attached to a surface of the pressure-sensitive adhesive layer, and thus the pressure-sensitive adhesive sheet with the release liner of Comparative Example 2 was obtained.

Comparative Example 3

A base (j) having a three-layer structure was produced by a dry laminating method. The base (j) sequentially includes a first PI film that has a thickness of 25 µm, an aluminum layer that has a thickness of 7 µm, and a second PI film that has a thickness of 9 µm from the front side. The produced base (j) had a total thickness of 46 µm. The adhesive composition solution I that is the same one as used in Example 1 was applied onto the second PI film layer on the rear side of the base (j) such that the dried adhesive composition solution has a thickness of 30 µm. Then, the adhesive composition solution was dried at 120° C. for three minutes to obtain a pressure-sensitive adhesive layer on the base (j). In addition, the release liner same as one in Example 1 was attached to a surface of the pressure-sensitive adhesive layer, and thus the pressure-sensitive adhesive sheet with the release liner of Comparative Example 3 was obtained.

Comparative Example 4

An adhesive composition solution II was obtained in the same manner as the adhesive composition solution I of Example 1, except that the content of 4-hydroxybutyl acrylate was changed to 0.05 parts by mass and the content of the isocyanate crosslinking agent was changed to 0.4 parts by mass (in terms of solids content).

The adhesive composition solution II was applied onto the second PET film layer on the rear side of the base (b) (refer to Example 4) such that the dried adhesive composition solution II has a thickness of 30 µm. Then, the adhesive composition solution II was dried at 120° C. for three minutes to obtain a pressure-sensitive adhesive layer on the base (b). Then, the release liner same as that in Example 1 is attached to a surface of the pressure-sensitive adhesive layer, and thus the pressure-sensitive adhesive sheet with a release liner of Comparative Example 4 was obtained.

Comparative Example 5

A pressure-sensitive adhesive sheet with a release liner of Comparative Example 5 was produced in the same manner as in Example 1, except that the adhesive composition solution I was applied onto the second PET film layer on the rear side of the base (a) such that the dried adhesive composition solution has a thickness of 10 µm.

Initial Elastic Modulus of Base

The initial elastic modulus ($N/nm^2$) of the bases (a)-(j) of Examples and Comparative Examples were measured in the method described below.

A piece having a size of 10 mm width by 50 mm length was cut from the pressure-sensitive adhesive tape with a release liner obtained in the examples. The release liner is removed from the piece is obtained as a specimen. An upper end portion of the specimen was grasped and fixed by an upper grip of a tensile testing machine and then, the upper grip is moved such that a distance between the upper and lower grips is 20 mm, and a lower end portion of the specimen was grasped and fixed by the lower grip. The fixed specimen was subjected to a tensile test (a stress-strain test) at a rate of 50 mm/min and an elastic modulus was calculated from initial deformation as an initial elastic modulus.

Product of Initial Elastic Modulus of Base and Thickness of Base

The product of the initial elastic modulus ($N/nm^2$) of each of the bases and the thickness (a total thickness T1) of each of the bases was calculated and the results are described in Table 1.

[Loss Elastic Modulus G" of the Pressure-Sensitive Adhesive Layer]

The loss elastic modulus G" of each of the pressure-sensitive adhesive layers (70° C.) including the adhesive composition solution I and II was measured by the method described below.

The adhesive composition solution was applied to a release processed surface of a PET film that has one release processed surface and a thickness of 38 µm such that the dried adhesive composition solution has a thickness of 50 µm. Then, the PET film having the adhesive composition solution applied thereon was dried at 130° C. for three minutes and subjected to an aging treatment at 50° C. for twenty four hours so that the obtained pressure-sensitive adhesive layer was separated from the PET film. Then, multiple pressure-sensitive adhesive layers were laminated to be a pressure-sensitive adhesive layer having a thickness of 2 mm and a disk-like shape piece having a diameter of 7.9 mm that was punched out from the pressure-sensitive adhesive layer is obtained as a specimen. The specimen was grasped and fixed by parallel plates having a diameter of 7.9 mm and the loss elastic modulus G" at 70° C. was measured by a viscoelasticity testing machine (Advanced Rheometric Expansion System [ARES] supplied by Rheometric Scientific). The measurement conditions are as follows.

<Measurement Conditions>
Frequency: 1 Hz
Temperature rising rate: 5° C./min
Measurement temperature range: −6° C. to 200° C.
Measurement mode: shearing mode
Probe Tackiness of Pressure-Sensitive Adhesive Layer The probe tackiness ($kN/m^2$) of the pressure-sensitive adhesive layer according to each of Examples and Comparative Examples was measured according to a method of ASTM D2979 (a method of testing pressure-sensitive adhesive force of adhesive by a falling tester).

A circular stainless probe (diameter: 5 mm) of the falling tester was contacted with a pressure-sensitive adhesive surface of the pressure-sensitive adhesive layer for one second with application of a certain load (100 gf/5 mmØ), the release liner has been removed from the surface of the pressure-sensitive adhesive layer. Then, a force required for separating the probe from the pressure-sensitive surface vertically was obtained as a probe tackiness (adhesive force) value of the pressure-sensitive adhesive layer. A contact speed of the probe is 100 mm/min and a separation speed is 100 mm/min. The results are described in Table 1.

[Evaluation]

The following evaluation tests were carried out on the pressure-sensitive adhesive sheets of Examples 1 to 9 and Comparative Examples of 1 to 5.

1. Moisture Permeability Test

Moisture permeability was measured according to a moisture permeability test (Dish method) defined in JIS Z0208. Specifically, the pressure-sensitive sheet was cut into a circular shape having a diameter of 30 mm (circumference of about 94 mm) according to an opening diameter of a test cup (made of aluminum and used in Dish method defined in JISZ0208) and provided as a test piece. 15 g of calcium chloride was put in the test cup and the opening of the test cup was covered with the test piece and was sealed by the test piece. The opening edge of the cup 6 that is in contact with (to be attached to) the adhesive surface of the test piece had a width (an overlap width) of 2.0 mm.

Then, the cup was left standing in a constant temperature/humidity chamber at a temperature of 60° C. and a humidity of 90% RH for about twenty four hours. Then, an increased amount of weight of the calcium chloride was measured to obtain the moisture permeability (g/m$^2$/24 h). The pressure-sensitive adhesive sheet that shows moisture permeability (g/m$^2$/24 h) of 0.1 or less was determined to have sufficient moisture suppression performance (gas barrier properties). The results are described in Table 1.

2. Peel Test with Constant Load

Figure 6:
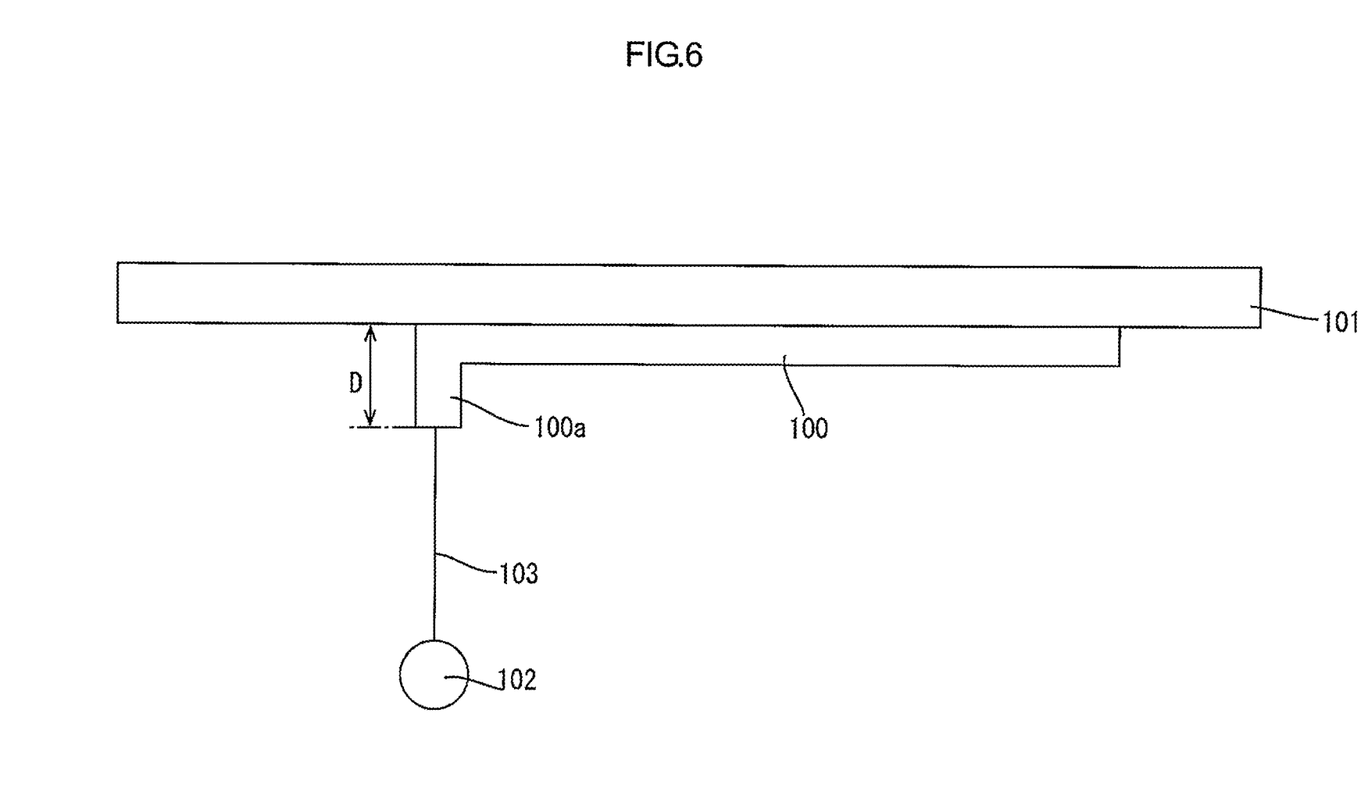
FIG. 6 is a side view typically illustrating a tester for the peel test with a constant load.

The pressure-sensitive adhesive sheet was cut into a strip shape having a width of 10 mm and a length of 100 mm and provided as a test piece. Then, the release liner was removed from the test piece having the strip shape. The test piece was attached to a test plate (SUS304BA) with using a roller of 5 kg. After the test piece was attached to the SUS plate, they were left standing at a room temperature (23° C.) for twenty four hours. FIG. 6 schematically illustrates a tester for the peel test with a constant load. As illustrated in FIG. 6, the test plate 101 was fixed horizontally such that a surface thereof on which the test piece 100 was attached faces downward. A weight 102 of 100 g was put on one end 100$a$ of the test piece 100 with using a string 103. The test piece 100 as illustrated in FIG. 6 was put in an environment at a temperature of 70° C. and a separation distance D of the test piece 100 was measured after one hour. A distance from the surface of the test plate 101 and the one end 100$a$ of the test piece 100 was measured as the separation distance D. The pressure-sensitive adhesive sheet that shows the separation distance D of 2 mm or less was determined to have sufficient adhesive reliability (adhesive force). The results are described in Table 1.

3. Repulsion Resistance Test

A double-sided pressure-sensitive adhesive sheet (product name "No. 5000NS" supplied by Nitto Denko Corporation) was attached to the base of the pressure-sensitive adhesive sheet of Examples and Comparative Examples and cut into a strip shape having a width of 10 mm and a length of 90 mm. The release liner of the double-sided pressure-sensitive adhesive sheet was detached from the cut piece and an aluminum plate (A1050, thickness of 0.3 mm) having a same size was attached to the adhesive surface of the double-sided pressure sensitive adhesive sheet and provided as a test piece. The test piece was bent to be curved with respect to a longitudinal side along a column having a diameter of 65 mm such that the aluminum plate is on an inner side. Next, the release liner of the pressure-sensitive adhesive sheet is detached therefrom and the test piece was attached with pressure to a clean adherend that was washed with being rubbed with a clean rag impregnated with isopropyl alcohol and reciprocation of rubbing was repeated ten times. The test piece was attached to the adherend using a laminator without having any lifting. The adherend to which the test piece was attached was left in a room temperature for five hours and a lifting amount of an end of the elongated test piece from the surface of the adherend was measured and the measured results were evaluated according to following evaluation standard. The lifting amount was measured at two ends of the test piece and a total amount of the results at the two ends (a total lifting height) was obtained as a repulsion resistance value. An aluminum plate (A1050) was used as the adherend. The evaluation was made for the lifting height of the test piece that was left at 70° C. for twenty four hours. The pressure-sensitive adhesive sheet that shows the repulsion resistance value of more than 2 mm was determined to have insufficient repulsion resistance. The results are described in Table 1.

TABLE 1

| | | | EXAMPLE | | | | | | | |
|---|---|---|---|---|---|---|---|---|---|---|
| | | | 1 | 2 | 3 | 4 | 5 | 6 | 7 | 8 |
| BASE | FIRST RESIN LAYER (FRONT SIDE) | MATERIAL | PET | PET | PET | PET | OPP | OPP | OPP | OPP |
| | | THICKNESS t1 (μm) | 9 | 9 | 9 | 25 | 30 | 40 | 30 | 40 |
| | METAL LAYER | MATERIAL | Al | Al | Al | Al | Al | Al | Al | Al |
| | | THICKNESS t2 (μm) | 7 | 7 | 7 | 7 | 7 | 7 | 7 | 7 |
| | SECOND RESIN LAYER (REAR SIDE) | MATERIAL | PET | PET | PET | PET | OPP | OPP | OPP | OPP |
| | | THICKNESS t3 (μm) | 9 | 9 | 9 | 9 | 9 | 9 | 4.5 | 4.5 |
| | TOTAL THICKNESS T1 (μm) | | 30 | 30 | 30 | 46 | 51 | 61 | 46.5 | 56.5 |
| | PRODUCT OF INITIAL ELASTIC MODULUS AND TOTAL THICKNESS T1 (N/mm) | | 2076 | 2076 | 2076 | 2528 | 1620 | 1816 | 1233 | 1670 |
| PRESSURE-SENSITIVE ADHESIVE LAYER | RESIN COMPOSITION SOLUTION | | I | I | I | I | I | I | I | I |
| | THICKNESS T2 (μm) | | 15 | 30 | 45 | 30 | 30 | 30 | 30 | 30 |
| | G"(Pa)(70° C.) | | $5 \times 10^4$ | $5 \times 10^4$ | $5 \times 10^4$ | $5 \times 10^4$ | $5 \times 10^4$ | $5 \times 10^4$ | $5 \times 10^4$ | $5 \times 10^4$ |
| | PROBE TACKINESS (kN/m$_2$) | | 125 | 150 | 190 | 150 | 150 | 150 | 150 | 150 |
| EVALUATION | MOISTURE PERMEABILITY (g/m$^2$/24 h) | | 0.05 | 0.00 | 0.02 | 0.00 | 0.00 | 0.00 | 0.00 | 0.00 |

TABLE 1-continued

|  |  |  |  |  |  |  |  |  |
|---|---|---|---|---|---|---|---|---|
| SEPARATION DISTANCE (mm/1 h, 70° C.) | 1 | 1 | 1 | 1 | 1 | 1 | 1 | 1 |
| TOTAL LIFTING HEIGHT (mm/24 h, 70° C.) | 1 | 0 | 1 | 0 | 0 | 0 | 0 | 0 |

|  |  |  | EXAMPLE | COMPARATIVE EXAMPLE | | | | |
|---|---|---|---|---|---|---|---|---|
|  |  |  | 9 | 1 | 2 | 3 | 4 | 5 |
| BASE | FIRST RESIN LAYER (FRONT SIDE) | MATERIAL | PET | PET | PET | PI | PET | PET |
|  |  | THICKNESS t1 (μm) | 38 | 38 | 50 | 25 | 25 | 9 |
|  | METAL LAYER | MATERIAL | Al | Al | Al | Al | Al | Al |
|  |  | THICKNESS t2 (μm) | 7 | 7 | 7 | 7 | 7 | 7 |
|  | SECOND RESIN LAYER (REAR SIDE) | MATERIAL |  | PET | PET | PI | PET | PET |
|  |  | THICKNESS t3 (μm) |  | 9 | 9 | 9 | 9 | 9 |
|  | TOTAL THICKNESS T1 (μm) |  | 47.5 | 59 | 71 | 46 | 46 | 30 |
|  | PRODUCT OF INITIAL ELASTIC MODULUS AND TOTAL THICKNESS T1 (N/mm) |  | 2402 | 3014 | 3433 | 3160 | 2528 | 2076 |
| PRESSURE-SENSITIVE ADHESIVE LAYER | RESIN COMPOSITION SOLUTION |  | I | I | I | I | II | I |
|  | THICKNESS T2 (μm) |  | 30 | 30 | 30 | 30 | 30 | 10 |
|  | G"(Pa)(70° C.) |  | $5 \times 10^4$ | $5 \times 10^4$ | $5 \times 10^4$ | $5 \times 10^4$ | $2 \times 10^4$ | $5 \times 10^4$ |
|  | PROBE TACKINESS (kN/m$_2$) |  | 150 | 150 | 150 | 150 | 130 | 60 |
| EVALUATION | MOISTURE PERMEABILITY (g/m$^2$/24 h) |  | 0.00 | 0.00 | 0.00 | 0.00 | 0.00 | 0.30 |
|  | SEPARATION DISTANCE (mm/1 h, 70° C.) |  | 1 | 2 | 3 | 3 | 15 | 4 |
|  | TOTAL LIFTING HEIGHT (mm/24 h, 70° C.) |  | 0 | 2 | 2 | 2 | 10 | 1 |

As described in Table 1, it was confirmed that the pressure-sensitive adhesive sheets of Examples 1 to 9 are excellent in the gas barrier properties (moisture resistance) and the repulsion resistance.

It was confirmed that the pressure-sensitive adhesive sheets of Comparative Examples 1 to 4 are not good in the repulsion resistance and the pressure-sensitive adhesive sheet of Comparative Example 5 is not good in the gas barrier properties (moisture resistance).

The sticking strength and the tearing strength of the pressure-sensitive adhesive sheet of Example 4 were measured.

Sticking Strength

The sticking strength (N/sqmm) of the pressure-sensitive adhesive sheet of Example 4 was measured according to JIS Z1707 (general rules of plastic films for food packaging) (diameter: 2.5 mm, sticking speed: 10 mm/min). The measurement result was 7.78 N/sqmm.

Tearing Strength

The tearing strength (mN) of the pressure-sensitive adhesive sheet of Example 4 was measured according to JIS P8116 (Elmendorf method) (eight lamination layers). The measurement result was 607 mN.

The invention claimed is:

1. A pressure-sensitive adhesive sheet comprising:
a pressure-sensitive adhesive layer having an adhesive surface on a rear side thereof, the adhesive surface being attached to an adherend; and
a base including a metal layer disposed on a front side with respect to the adhesive layer and a resin layer disposed on a front side with respect to the metal layer, wherein
a product of an initial elastic modulus of the base and a total thickness of the base is 3000 N/mm or less, and
a separation distance is 2 mm or less, the separation distance is measured with a peel test with a constant load as follows:
a test piece of the pressure-sensitive adhesive sheet having a width of 10 mm and a length of 100 mm is attached to a surface of a test plate made of stainless steel plate such that the adhesive surface is attached to the surface of the test plate and then, the test plate is left standing at a temperature of 23° C. for twenty four hours and then, a load of 100 gf is applied to one end of a length dimension of the test piece vertical to the surface of the test plate and a separation distance of the test piece is measured after one hour.

2. The pressure-sensitive adhesive sheet according to claim 1, wherein a loss elastic modulus G" of the pressure-sensitive adhesive layer at 70° C. is $5 \times 10^3$ Pa or more.

3. The pressure-sensitive adhesive sheet according to claim 1, wherein the pressure-sensitive adhesive layer has probe tackiness of 120 kN/m$^2$ or more.

4. The pressure-sensitive adhesive sheet according to claim 1, wherein the pressure-sensitive adhesive layer has a thickness T2 of 12 μm or more.

5. The pressure-sensitive adhesive sheet according to claim 1, wherein a ratio of a total thickness of the resin layer and another resin layer other than the resin layer included in the base to a thickness t2 of the metal layer is from 1.5 to 8.0.

6. The pressure-sensitive adhesive sheet according to claim 1, wherein a ratio T2/T1 of a thickness T2 of the pressure-sensitive adhesive layer to a total thickness T1 of the base is from 0.2 to 2.5.

7. The pressure-sensitive adhesive sheet according to claim 1 used as a cover seal for a magnetic disk drive.

8. A magnetic disk drive comprising:
a magnetic disk unit including a magnetic disk;
a head unit including a magnetic head configured to read or write information on the magnetic disk;
a base member having a box like shape with an opening at one side and including a frame shaped end portion extending around the opening, the base member housing the magnetic disk unit and the head unit therein;

a cover attached to the base member and covering the opening of the base member, the cover having an outer peripheral portion surrounded by an inner peripheral portion of the frame shaped end portion; and a cover seal being the pressure-sensitive adhesive sheet according to claim 1 and including a seal main portion attached over the frame shaped end portion and the cover such that the cover seal covers a gap between the inner peripheral portion of the frame shaped end portion and the outer peripheral portion of the cover, and an extended portion extending from a peripheral edge of the seal main portion and attached to a side surface of the base member, the cover seal being attached to an upper surface of the cover and an upper surface and the side surface of the base with being bent along the upper surfaces and the side surface.

9. The magnetic disc drive according to claim 8, wherein a loss elastic modulus G" of the pressure-sensitive adhesive layer at 70° C. is $5 \times 10^3$ Pa or more.

10. The magnetic disc drive according to claim 9, wherein the pressure-sensitive adhesive layer has probe tackiness of 120 kN/m² or more.

11. The magnetic disc drive according to claim 9, wherein the pressure-sensitive adhesive layer has a thickness T2 of 12 μm or more.

12. The magnetic disc drive according to claim 9, wherein a ratio of a total thickness of the resin layer and other resin layers than the resin layer included in the base to a thickness t2 of the metal layer is from 1.5 to 8.0.

13. The magnetic disc drive according to claim 9, wherein a ratio T2/T1 of a thickness T2 of the pressure-sensitive adhesive layer to a total thickness T1 of the base is from 0.2 to 2.5.

14. The pressure-sensitive adhesive sheet according to claim 2, wherein the pressure-sensitive adhesive layer has probe tackiness of 120 kN/m² or more.

15. The pressure-sensitive adhesive sheet according to claim 2, wherein the pressure-sensitive adhesive layer has a thickness T2 of 12 μm or more.

16. The pressure-sensitive adhesive sheet according to claim 3, wherein the pressure-sensitive adhesive layer has a thickness T2 of 12 μm or more.

17. The pressure-sensitive adhesive sheet according to claim 2, wherein a ratio of a total thickness of the resin layer and other resin layers than the resin layer included in the base to a thickness t2 of the metal layer is from 1.5 to 8.0.

18. The pressure-sensitive adhesive sheet according to claim 3, wherein a ratio of a total thickness of the resin layer and other resin layers than the resin layer included in the base to a thickness t2 of the metal layer is from 1.5 to 8.0.

19. The pressure-sensitive adhesive sheet according to claim 4, wherein a ratio of a total thickness of the resin layer and other resin layers than the resin layer included in the base to a thickness t2 of the metal layer is from 1.5 to 8.0.

20. The pressure-sensitive adhesive sheet according to claim 2, wherein a ratio T2/T1 of a thickness T2 of the pressure-sensitive adhesive layer to a total thickness T1 of the base is from 0.2 to 2.5.

* * * * *